Patented Apr. 13, 1943

2,316,598

UNITED STATES PATENT OFFICE 2,316,598

METHOD OF POLYMERIZING 2-HALOGENO-BUTADIENE-1,3

Ryukichi Kitani, Naoichi Takashima, and Hideo Kaneko, Kawasaki, Japan, assignors to General Electric Company, a corporation of New York No Drawing. Application December 18, 1940, Serial No. 370,724. In Japan January 19, 1940

3 Claims. (Cl. 260—92.7)

This invention relates to certain improvements and modifications in the art of polymerizing 2-halogeno-butadiene-1,3, for example 2-bromo-butadiene-1,3, 2-chloro-butadiene-1,3 (chloroprene), etc.

It is a primary object of the present invention to provide an improved process for polymerizing 2-halogeno-butadiene-1,3 whereby high yields of polymeric material of a desired degree of polymerization can be obtained rapidly and economically.

It has been known heretofore that monomeric 2-halogeno-butadiene-1,3, for example monomeric chloroprene, could be polymerized to a plastic, solid mass in the presence or absence of various polymerization inhibitors or other addition agents. It also has been known that such polymerizable organic compounds could be polymerized by the so-called "emulsion-polymerization" process. The properties of these plastic polymers are greatly affected by the particular conditions of polymerization such, for example, as the kinds of emulsifying agents, inhibitors, etc., employed, time and temperature of polymerization, whether the polymerization was carried out in the presence or absence of light, or in the presence or absence of air or oxygen, etc. Even when the most careful effort was made to maintain the conditions of polymerization the same at all times there was, by the methods heretofore employed, still considerable variation in the properties of the plastic polymers. These variations in properties have been very undesirable, since it necessitated extensive changes in the compounding of the polymer with fillers, etc., in order to adapt it for a particular service application. Furthermore, when the properties of the product varied so widely it was impossible to predict whether or not it would have the desired service life.

From our reserach investigations in this field we believe that these differences in characteristics may be explained as follows: When monomeric 2-halogeno-butadiene-1,3, e. g., chloroprene, is polymerized, there are first formed linear polymers of relatively low molecular weight. Formation of these linear polymers is greatly affected by the polymerization conditions and variations therein have a material influence on the character of the final polymerization product. When unpolymerized chloroprene or the like is polymerized by the emulsion process, it is difficult to form linear polymers of uniform characteristics due to the high velocity of reaction when polymerization is carried out in this way. Polymerization of monomeric 2-halogeno-butadiene-1,3 by exposure of the unmodified compound to slow polymerization influences not only is unsatisfactory both from the standpoint of yield and the long time of polymerization required, but also does not lend itself readily to the production of linear polymers of uniform properties.

On the other hand, when the velocity of the polymerization reaction is enhanced, as it is by the conventional emulsion-polymerization process, then chlorine and hydrogen atoms of the molecule of chloroprene may be liberated. This is especially possible when the emulsion is exposed to oxygen or oxygen-containing compounds. Such free chlorine and hydrogen forms hydrochloric acid, enhances the acidity of the polymer and results in a non-uniform polymerization of the monomeric compound. Furthermore, the liberated chlorine (or the acid formed therefrom) imparts an objectionable odor to the final polymerization product, thereby decreasing its value.

We have discovered that the above difficulties in the polymerization of a 2-halogeno-butadiene-1,3 can be obviated, and products of uniform characteristics from batch to batch can be produced, by dividing the polymerization of the said compound into two distinct polymerization steps: (1) a foundation polymerization step and (2) a main polymerization step.

In the foundation polymerization step unpolymerized chloroprene or the like is caused to polymerize at a low reaction rate thereby to obtain lowly polymerized foundation molecules. This initial partial polymer advantageously is washed, for example with an aqueous alkaline solution. The washed partial polymer is then subjected to a main polymerization process wherein the reaction is caused to proceed at a materially higher velocity than it did during the foundation polymerization. This main polymerization reaction may be carried out by the emulsion-polymerization process.

As is well known, chloroprene is a readily polymerizable substance and the polymerization velocity thereof is very high. The unpolymerized material will polymerize in the absence of a polymerization catalyst. It is extremely sensitive to slight, external, coercing conditions. Hence, often, if the polymerization influences are chosen so as to get one result, which it is believed from past experience will be obtained, it frequently happens that a polymeric body, having properties entirely different from what was expected, is secured. The period in which the monomer is so sensitive to external influences is that during which the initial linear polymerization is taking place. We have discovered that by carefully controlling the conditions of this initial polymerization reaction, thereafter the partial polymer can be polymerized at a much higher rate of reaction with less attention to polymerization influences. By so doing, a polymerized product of uniform characteristics is obtained rapidly and economically. In order to obtain uniform, linear polymers in the initial polymerization reaction, it is necessary to permit equal activation of the unpolymerized molecules. With 2-halogeno-butadiene-1,3, specifically chloroprene, we have found that the desired partial polymer best can be obtained by carrying out the foundation polymerization at a temperature not exceeding substantially about 12° C. Other polymerization influences to which consideration should be given in order to obtain optimum results from the foundation polymerization are the time of polymerization, the atmosphere in contact with the material being polymerized and the composition of the walls of the container.

In carrying our invention into effect, we prefer to effect the initial polymerization of the 2-halogeno-butadiene-1,3 at a temperature less than 12° C., more particularly within the range of 0 to 10° C. Such low temperatures heretofore have been considered unsatisfactory, from a practical standpoint, for utilization in the polymerization of 2-halogeno-butadiene-1,3, since the rate of polymerization at such temperatures is so very low. However, we have found that such temperatures are especially favorable for the foundation polymerization step whereby uniform linear polymers are obtained. Polymerization for periods of the order of 40 to 50 hours or more at such temperatures usually are satisfactory.

The walls of the container in which the polymerization reaction is carried out preferably are formed of, or at least lined with, a smooth-surfaced material such as glass or a synthetic organic material. For optimum results the use of metallic containers having rough inner walls should be avoided.

The nature of the atmosphere which is in contact with the material being polymerized also is important. When oxygen or an atmosphere that contains oxygen or an oxygenous compound, e. g., carbon monoxide, carbon dioxide, etc., is in contact with the 2-halogeno-butadiene-1,3, the foundation linear molecules may add undesired side chains. Such gases therefore should be avoided for optimum results. Instead, inert gases such as nitrogen, krypton, etc., should be present.

To eliminate halogen or acid bodies that may be present in the initially formed partial polymer (foundation polymer), it is advantageous to wash the foundation polymer to remove such materials. This may be done, for example, by washing the polymer first with a dilute alkali solution followed by a water wash. A one per cent caustic soda solution advantageously may be used for this purpose. Washing in this way effectively removes objectionable odor and, further, aids in keeping the hydrogen ion concentration at the point desired for the main polymerization.

The foundation polymer produced in the described manner then may be caused to polymerize further at a higher reaction rate. Preferably the emulsion-polymerization process is employed. For optimum results we advantageously use a process such as described in the copending application of Ryukichi Kitani and Naoichi Takashima, application Serial No. 370,708, filed concurrently herewith and assigned to the same assignee as the present invention. The foundation polymer is first dispersed in a liquid media and thereafter polymerized further at a higher polymerization rate than the rate of the foundation polymerization reaction. To the emulsified, highly polymerized material is added a coagulating agent in an amount insufficient to cause coagulation of the polymer upon adding such agent to the emulsion but sufficient to cause coagulation when the emulsion is concentrated to a substantially lesser volume. The emulsion is concentrated in the presence of the coagulating agent to an extent such that coagulation of the dispersed polymer is effected. Finally, the coagulated solid 2-halogeno-butadiene-1,3 of the desired degree of polymerization is isolated from the other components of the mass.

Any suitable method may be employed in dispersing the foundation polymer in a liquid dispersion media and in further polymerizing the dispersed polymer at a higher polymerization rate. For example, a foundation polymer of chloroprene may be placed in a suitable receptacle, for instance a container of glass or of a synthetic organic material having smooth inner walls. To this compound is added an oxygen-free emulsifying liquid or dispersion media, for example an aqueous, dilute soap solution. The mass is now agitated by suitable means to form a dispersion of the foundation polymer in the dispersion media.

Any suitable dispersion media may be used. For instance, it may consist of an aqueous solution of a soap such as sodium oleate, sodium palmitate, sodium stearate, sodium linoleate, etc., or of aqueous solutions of alkyl ester sulfates or various naphthalene sulfonates. We prefer to use a liquid dispersion media comprising water. Glue, agar-agar or such protective colloids as albumen may be added to stabilize the emulsion. Further, salts or acids may be added in order properly to adjust the concentration of ions in the emulsion.

The polymerization reaction of the foundation polymer is exothermic. When the evolved heat does not disperse quickly, the resultant polymer often is not homogeneous. Hence it is preferred to place the reaction vessel in an ice-water bath to cool it and, at the same time, to distribute the evolved heat evenly by agitating the contents. Agitation should be so carried out so that the foundation polymer is activated uniformly to high molecular weight polymers. Preferably an inert gas such as nitrogen is kept in contact with the emulsion. By simultaneous agitation and cooling in this way, the use of polymerization retarders usually is not necessary and plastic polymers of good properties can be obtained as final products.

The higher the molecular weight of the dispersed polymeric body, the less the amount of coagulant ordinarily required to effect coagulation of the dispersed polymer. By adding a coagulating agent to the emulsified polymer in an amount insufficient to cause immediate coagulation, the coagulant-containing emulsion thereafter can be distilled to remove volatile matter (dispersion media, unpolymerized material and, also, if desired, lowly polymerized bodies) without any of the difficulties that heretofore have existed. Upon concentrating the emulsion, as by distillation, the coagulant causes the dispersed high molecular weight polymers to coagulate. The coagulated mass is separated from the undistilled liquid, water-washed, and freed from entrapped water, for example by working on rolls to press out the water followed by drying at a suitable temperature under atmospheric or subatmospheric pressures to remove the last traces of water.

If desired, one may added to the emulsion prior to concentrating the same to coagulate the highly polymerized body some polymeric material of lower molecular weight, thereby to obtain a more plastic polymerized substance as the final product. This modifying polymer may be obtained from a previous batch wherein the polymerization influences were so adjusted as to obtain a lowly polymerized body.

Antioxidants may be incorporated into the polymeric mass prior to, during or after the steps of washing and drying the coagulated mass. Advantageously an antioxidant is added to the liquid mass containing dispersed, polymerized 2-halogeno-butadiene-1,3 prior to heating said mass to vaporize volatile components and to coagulate the said dispersed compound.

Any coagulating agent may be employed. Illustrative examples of coagulating agents are salts, e. g., salts of polyvalent metals such as aluminum sulfate, magnesium chloride, barium chloride, etc., salts of monovalent metals such as sodium chloride, sodium sulfate, etc., acids such as formic acid, acetic acid, etc., magnesium sulfide, and the like.

In order that those skilled in the art better may understand how the present invention may be carried into effect, the following illustrative example thereof is given. All parts are by weight.

*Example 1*

Four hundred parts of refined chloroprene are placed in a suitable receptacle, for example a glass container. The container is evacuated to remove all air, nitrogen is introduced therein, the container is immersed in an ice bath and polymerization of the chloroprene is allowed to proceed under these conditions for about 48 hours to form a foundation polymer. This foundation polymer is washed first with a dilute alkali solution, for example a 1% caustic soda solution, and then with water.

The washed, partially polymerized chloroprene is mixed, in a suitable vessel provided with an agitator, with an oxygen-free, dilute, aqueous soap solution. Such a solution may be prepared, for instance, by dissolving 5 parts sodium oleate in 250 parts distilled water which has been boiled to remove any dissolved or entrapped air. The vessel is evacuated to remove air and nitrogen is introduced. The mass is vigorously agitated, resulting in a homogeneous emulsion. Agitation is continued, while cooling the container so that the temperature does not rise more than 10° C. over the initial (room) temperature of the mass. After 5 or 6 hours' agitation in this manner, there will have been effected approximately a 50% conversion (based on the amount of starting monomeric chloroprene) to highly polymerized chloroprene.

To the resulting mass is now added an antioxidant, e. g., 10 parts of pyrogallol, hydroquinone or other antioxidant and a coagulating agent, e. g., 60 parts magnesium chloride.

The emulsion containing the antioxidant and coagulating agent is now distilled. A fraction comprising unpolymerized and lowly polymerized chloroprene is obtained upon vacuum distillation as a clear, colorless distillate. This fraction advantageously is stored in a suitable vessel maintained at a low temperature, say minus 25° C. or lower, and may be reused in the process.

Distillation is continued under about 10 mm. pressure until the polymer has coagulated and has separated from the liquid in the form of a soft, semi-solid mass. This coagulation of the polymer usually takes place after distillation has proceeded for about 40 or 50 minutes. A total of 172 parts unpolymerized and partially polymerized material was vaporized and recovered. The coagulated mass is separated from the liquid dispersion media, washed until substantially all the coagulating agent has been removed, pressed free of water by working on hot rolls or the like, and then dried at a suitable temperature to remove the last traces of water. Antioxidants may be incorporated into the dried polymer. Phenyl beta naphthylamine, for example, may be kneaded into the polymeric mass. The resulting product is a light-brown, crepe-like, semi-transparent mass having a slight odor.

We prefer to use the emulsion-polymerization process above described in carrying out the main polymerization of the 2-halogeno-butadiene-1,3 subsequent to the described foundation polymerization process. However, other processes for causing the partial polymer to polymerize at a higher polymerization velocity than its rate during the foundation polymerization may be employed. For example, higher polymerization rates may be obtained by increasing the temperature of polymerization over that employed in the foundation polymerization, by using a polymerization catalyst, and by otherwise altering the conditions of polymerization.

From the foregoing description it will be seen that the present invention provides a method of polymerizing 2-halogeno-butadiene-1,3 which comprises forming a foundation polymer by partially polymerizing the said compound at a relatively low reaction rate and causing the said foundation polymer to polymerize further at a substantially higher reaction rate. Thus, we may partially polymerize 2-halogeno-butadiene-1,3 at a temperature not exceeding substantially 12° C. thereby to form a foundation polymer at a relatively low reaction rate. Then we may emulsify the foundation polymer, cause the emulsified polymer to polymerize further at a substantially higher reaction rate than that employed in the initial polymerization of the starting 2-halogeno-butadiene-1,3 (e.g., 2-chloro-butadiene-1,3) to a foundation polymer, and isolate the more highly polymerized 2-halogeno-butadiene-1,3 from the other components of the mass.

Our invention also provides a method of polymerizing 2-halogeno-butadiene-1,3, specifically chloroprene, which comprises partially polymerizing the said compound at a temperature within the range of 0 to 10° C. thereby to form a foundation polymer at a relatively low reaction rate, forming an emulsion of the foundation polymer, causing the emulsified foundation polymer to polymerize further at a substantially higher polymerization rate than that employed in its preparation, adding to the resulting mass a coagulating agent in an amount insufficient to cause immediate coagulation of the dispersed polymer but sufficient to cause coagulation when the emulsion is concentrated to a substantially lesser volume, concentrating the emulsion in the presence of the coagulating agent to an extent such that coagulation of the dispersed polymer is effected, and isolating the coagulated compound from the other components of the mass. Preferably we wash the foundation polymer with a dilute alkali solution prior to forming an emulsion of the same. The washing with alkali solution advantageously may be followed by water washing to remove the excess alkali and water-soluble salts.

The methods of this invention make it possible to obtain high yields of polymerized 2-halogeno-butadiene-1,3 of a desired degree of polymerization rapidly and economically.

What we claim as new and desire to secure by Letters Patent of the United States is:

1. A method of polymerizing 2-chloro-butadiene-1,3 which comprises partially polymerizing the said compound at a temperature not exceeding substantially 12° C. for from 40 to 50 hours in the presence of an inert atmosphere thereby to form a foundation polymer at a relatively low reaction rate, emulsifying the said polymer, causing the emulsified polymer to polymerize further at a substantially higher reaction rate than that employed in the initial polymerization of the starting 2-chloro-butadiene-1,3 to a foundation polymer, and isolating the more highly polymerized 2-chloro-butadiene-1,3 from the other components of the mass.

2. A method of producing polymerized 2-chloro-butadiene-1,3 which comprises partially polymerizing monomeric 2-chloro-butadiene-1,3 at a temperature within the range of 0 to 10° C. for from 40 to 50 hours in the presence of a nitrogen atmosphere thereby to form a foundation polymer at a relatively low reaction rate, forming an emulsion of the foundation polymer, causing the emulsified foundation polymer to polymerize further at a substantially higher polymerization rate than that employed in its preparation, and isolating the emulsion polymerized compound from the other components of the mass.

3. A method as in claim 2 which includes the additional step of washing the foundation polymer with a dilute alkali solution prior to forming an emulsion of the same.

RYUKICHI KITANI.
NAOICHI TAKASHIMA.
HIDEO KANEKO.